United States Patent
Saha et al.

(10) Patent No.: US 9,471,121 B2
(45) Date of Patent: Oct. 18, 2016

(54) MICROPROCESSOR BASED POWER MANAGEMENT SYSTEM ARCHITECTURE

(71) Applicant: TEXAS INSTRUMENTS INCORPORATED, Dallas, TX (US)

(72) Inventors: Arindam Saha, Bangalore (IN); Ish Kumar Dham, Bangalore (IN); Vijay Sarathy, Bangalore (IN); William B Bonnett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 546 days.

(21) Appl. No.: 13/676,573

(22) Filed: Nov. 14, 2012

(65) Prior Publication Data
US 2013/0124895 A1     May 16, 2013

Related U.S. Application Data

(60) Provisional application No. 61/559,177, filed on Nov. 14, 2011.

(51) Int. Cl.
*G06F 1/26* (2006.01)
*G06F 1/00* (2006.01)
*G06F 1/32* (2006.01)

(52) U.S. Cl.
CPC ............ *G06F 1/26* (2013.01); *G06F 1/3234* (2013.01); *G06F 1/3237* (2013.01); *G06F 1/3287* (2013.01); *Y02B 60/1221* (2013.01); *Y02B 60/1282* (2013.01)

(58) Field of Classification Search
CPC .................................. G06F 1/26; G06F 1/32
USPC .................................................. 713/323, 300
See application file for complete search history.

(56) References Cited

U.S. PATENT DOCUMENTS

| | | | |
|---|---|---|---|
| 5,570,397 A * | 10/1996 | Kubista ..................... 375/356 |
| 7,509,511 B1 * | 3/2009 | Barowski et al. ............ 713/320 |
| 8,547,135 B1 * | 10/2013 | Yarlagadda et al. ........... 326/38 |
| 8,607,036 B2 * | 12/2013 | More et al. ..................... 713/1 |
| 2008/0307240 A1 * | 12/2008 | Dahan et al. ................. 713/320 |
| 2009/0144571 A1 * | 6/2009 | Tatsumi ....................... 713/320 |
| 2009/0204831 A1 * | 8/2009 | Cousson et al. ............. 713/322 |
| 2010/0231044 A1 * | 9/2010 | Tatsumi et al. ................. 307/39 |
| 2011/0252251 A1 * | 10/2011 | de Cesare et al. ........... 713/320 |
| 2011/0276812 A1 * | 11/2011 | Lee et al. ..................... 713/300 |

* cited by examiner

*Primary Examiner* — Phil Nguyen
(74) *Attorney, Agent, or Firm* — Robert D. Marshall, Jr.; Frank D. Cimino

(57) ABSTRACT

An electronic system is disposed on a single integrated circuit including a plurality of power domains and a power control manager. Each power domain may be independently powered. The power control manager includes a set of control registers storing individual control bits, a power switch for each power domain and a programmable microprocessor. The programmable microprocessor controls the digital state of individual bits within the control registers thereby controlling the ON and OFF state of the corresponding power domain.

12 Claims, 4 Drawing Sheets

MICROPROCESSOR BASED POWER MANAGEMENT SYSTEM ARCHITECTURE

CLAIM OF PRIORITY

This application claims priority under 35 U.S.C. 119(e)(1) to U.S. Provisional Application No. 61/559,177 filed Nov. 14, 2011.

TECHNICAL FIELD OF THE INVENTION

The technical field of this invention is power management in programmable data processors.

BACKGROUND OF THE INVENTION

The requirement to achieve the lower power is constant for portable application products from portable navigation devices to cell phones. This requirement drives the most complex System on Chip (SoC) power management control functions commonly called as power-reset-clock-management (PRCM). In the prior art these functions are hardware based with limited configurability. Such hardwired functions reduce the flexibility after manufacture of the SoC. This increases the complexity of the power management control further because the prior art attempts to predict and account for all use cases. The significant complexity of this power control function, typically require significant investments of effort on chip design verification pre-silicon, post-silicon validation and debug, and finally for silicon re-spins due to bug fixes required following manufacture.

There is a need in the art to achieve very low power and flexibility for better execution efficiency. This is expected to thereby lower investment and cost.

SUMMARY OF THE INVENTION

The previous hardwired functions of power management control of this invention are partitioned between hardware and software. A small, low cost, low power microprocessor is included as part of the System-on-Chip (SoC) power management control to perform the software functions. This brings flexibility. The system can be fine tuned following manufacture. New states and sequences can be introduced at an application level after manufacture based on customer requirements.

The microprocessor brings execution efficiency since doing the complex functions in software does not need design verification and silicon re-spin costs due to bugs. The estimated cost of software development is five to ten times lower than a hardwired power control solution.

This invention introduces a low cost processor to perform some of the power control management functions. This is difference than other solutions which are hardwired with limited configurability. The invention provides both flexibility in the system power management solution and efficiency in execution.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
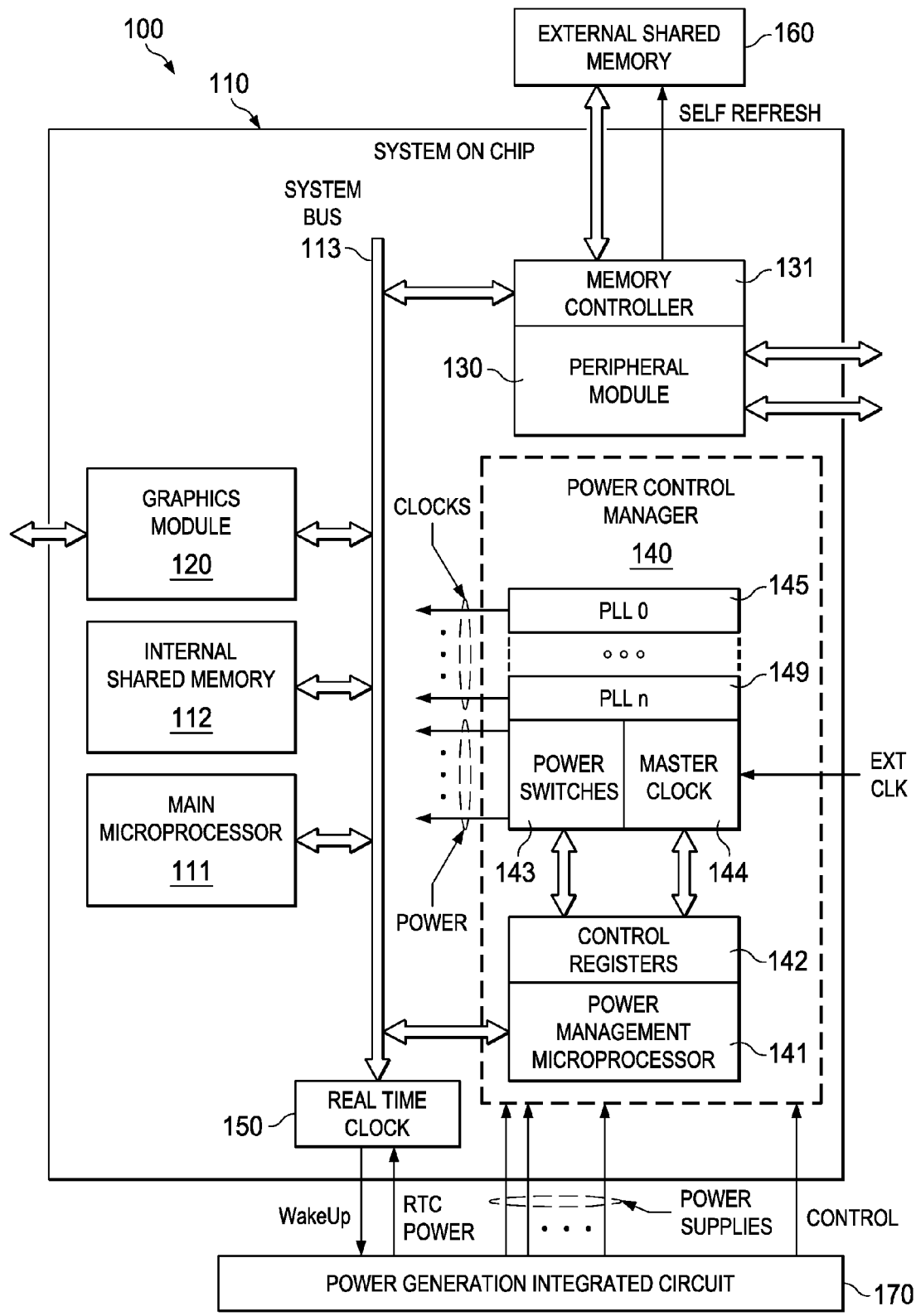
FIG. 1 is an overview of an exemplary device according the this invention.

This invention is power management for a microprocessor based system. This invention is particularly applicable to System on Chip (SoC) devices. This invention is described in conjunction with an integrated circuit incorporating the invention. FIG. 1 illustrates the exemplary electronic system including SoC 110, external shared memory 160; and power generation integrated circuit 170. SoC 110 includes the following features: a main microprocessor 111; a graphics module 120; a peripheral module 130; a memory controller 131; a power control manager 140 with a power management microprocessor 141; and a real time clock 150. This exemplary device is fabricated in a semiconductor process node with the smallest feature of 45 nM.

Main microprocessor 111 is usually a general purpose microprocessor including a central processing unit (CPU), register files, instruction decoder, non-volatile memory such as boot read only memory (ROM) and volatile memory for storage of instructions and data which may be in the form of one or more layers of instruction and/or data cache. These subparts of main microprocessor 111 are conventional, not related to this invention and thus not illustrated. Main microprocessor 111 communicates with other portions of SoC 110 especially internal shared memory 112 via system bus 113.

Graphics module 120 communicates with other portions of SoC 110 via system bus 113. Graphics module 120 preferably operates under supervision of main microprocessor 111 to generate display control signals for an external display (not shown). This external display is typically a liquid crystal display (LCD).

Peripheral module 130 includes various peripheral devices used in the operation of SoC 110. These typically include communication with external devices via standard busses such as Universal Serial Bus (USB), Universal Asynchronous Receiver/Transmitter (UART) and the like. The exemplary device includes a memory controller 131 which interfaces between system bus 113 and external shared memory 160. Various modules of SoC 110 may store data to and recall data from external shared memory 160 via memory controller 131.

Power control manager 140 provides power consumption control for SoC 110. Power control manager 140 is chiefly operated via power management microprocessor 141. Power management microprocessor 141 is preferably a general purpose microprocessor similar to main microprocessor 111. Power management microprocessor 141 differs from main microprocessor 111 in requiring much less computational capacity. Thus power management microprocessor 141 may operate on smaller data words, operate at a lower clock frequency and include fewer circuit enhancements than main microprocessor 111. Power management microprocessor 141 operates primarily by control of the data stored in control registers 142. The various modes of operation of this invention are achieved by control of power switches 143 and control of master clock 144 and phase locked loops 145 to 149 via control data in control register 142. Power management microprocessor 141 stores appropriate data in control registers 142 to achieve the desired power consumption state under program control. Note power switches 143 control the power voltage supply coupled to various power supply domains as detailed below. As noted below master clock 144 may be switched ON and OFF, phase locked loops 145 to 149 are independently switched ON and OFF and clock signals are independently gated ON and OFF to various clock domains of SoC 110. In the exemplary device master clock 144 includes an internal crystal oscillator for clock frequency control but may also be slaved to an external clock signal.

Real time clock 150 operates in a real time clock mode. An internal counter keeps a count of clock pulses related to the real time. These clock pulses are preferably generated by an integrated RC oscillator independent of master clock 144. Real time clock 150 compares the state of this internal counter with a count stored in one or more alarm time registers. When the count equals the alarm time, real time clock 150 generates a WakeUp signal supplied to power generation integrated circuit 170. In response to this WakeUp signal power generation integrated circuit supplies power to power control manager 140. Power control manager 140 responds with an action programmed into power management microprocessor 141. In the preferred embodiment main microprocessor 111 or power management microprocessor 141 may specify these alarm times by a register write operation via system bus 113.

Power generation integrated circuit 170 forms the various power supply voltages used by SoC 110. Power generation integrated circuit 170 supplies these power supply voltages to power control manager 140, which control distribution to the several power domains. The specific voltages generated and supplied to SoC 110 may be controlled by power control manager 140. The various power modes noted below specify voltage levels for various power supplies. The exemplary device power generation integrated circuit 170 operates electric power supplied by a system battery (not shown).

In the exemplary device the real time clock mode of real time clock 150 consumes 80 µA at 1.8 V. The real time clock mode keeps an account of real time for power wakeup alarms. Upon detection a programmable wake-up time, real time clock 150 generates a wake-up signal to power generation integrated circuit 170 in a manner further described below. The power generation integrated circuit 170 powers SoC 110 upon receipt of the wake-up signal, triggering system wake-up.

The exemplary device includes a Synchronous Dynamic Random Access memory (SDRAM) used as an external system shared memory 160. This SDRAM may retain its state during a DeepSleep 0 mode if placed in a self-refresh mode. Not including input/output (I/O) power the SDRAM consumes 1.3 mW at 25 C in this status.

The exemplary device includes five core logic power domains. The main microprocessor power domain, the peripheral power domain and the graphics power domain are switchable ON or OFF under software control by the power management microprocessor. The main microprocessor power domain preferably includes main microprocessor 111 and internal shared memory 112. The peripheral power domain preferably includes peripheral module 130. The graphics power domain preferably includes graphics module 120. The real time clock power domain and the wake up power domain are always ON. The real time power domain preferably includes real time clock 150. The wake up power domain preferably includes at least some portions of power control manager 140.

The exemplary device includes a dedicated, programmable power management microprocessor 141 for sleep and wake control as part of the power control manager 140.

The exemplary device includes Shut Down and Retention for memories in each power domain.

The exemplary device includes clock gating support for all SoC modules via power control manager 140.

The exemplary device includes support for crystal oscillator disable (only in crystal mode) with auto-wake from wake events. For non-crystal mode (external clock source), the external source should be shutoff and controlled externally. These functions are performed by power control manager 140.

The exemplary device includes six power modes. These are from lowest power consumption to highest power consumption: real time clock (RTC) only; DeepSleep 0; DeepSleep 1; DeepSleep 2; Standby; and Active. All voltage supplies must be maintained for the each of the DeepSleep, Standby and Active modes. In Active mode, all power domains are ON. In RTC mode, only the supplies to real time clock 150 are supplied. The lowest power modes are the Standby mode and the DeepSleep modes. The contents of SDRAM (Synchronous Dynamic Random Access Memory) used as external shared memory 160 may be preserved in any of the DeepSleep modes and the Standby mode. The SDRAM is placed in a self-refresh mode via memory controller 131 prior to entering a DeepSleep power mode to achieve this.

The exemplary device includes a microprocessor unit power supply VDD_MPU and a core power supply VDD_CORE. The exemplary device further includes an I/O power supply and a RTC power supply VDD_RTC.

The SoC I/O idle state power consumption is sensitive to the end application. Each end application determines what is connected to the I/O pins and what state these pins should be to maintain status-quo with connected devices during DeepSleep mode and wakeup requirements. The I/O idle power consumption is very dependent on the I/O state. At I/O supply minimum the exemplary device has an estimated idle power is about 1.2 mW. The estimated I/O maximum power is about 4.8 mW. The I/Os typically can be managed in most applications to consume close to the estimated minimum value. The estimated maximum power is unrealistic and very pessimistic. The power consumption estimates below exclude I/O idle power.

In the RTC mode only the RTC power domain is powered. Power consumption of the exemplary device, excluding I/O power, is less than 0.050 mW. The wakeup time to recover the Active mode and full operation is the same as that of a cold system reboot. In the RTC only mode both VDD_MPU and VDD_CORE are 0 V as selected by power switches 143. A special RTC power supply VDD_RTC is active in the RTC only mode. The RTC only mode has two options. The wakeup time may be improved by powering external system shared memory 160 in a self-refresh mode at the expense of additional power consumption. In a second option, the I/O power supply may be ON at the expense of additional power consumption by the I/O. As noted above I/O power consumption depends upon the pin state and can be minimized by the application.

The three DeepSleep modes provide a variety of power consumptions versus response time. The three modes are DeepSleep 0, DeepSleep 1 and DeepSleep 2. The contents of the system external shared memory 160 may be preserved in any of the DeepSleep modes. Placing the external shared memory 160 in a self-refresh mode prior to entering DeepSleep accomplishes this at the expense of additional power consumption. The crystal oscillator of master clock 144 is suspended in each of the DeepSleep modes to reduce active power. An integrated RC oscillator provides a clock to power control manager 140. The frequency of this clock ranges from 20 to 60 kHz depending on the integrated circuit manufacturing process.

In the DeepSleep 0 mode the supply to all voltage rails are maintained and only the RTC power domain for the real time clock 150 and the wake up power domains for wake up power are ON. The crystal oscillator of master clock 144 is disabled. The main microprocessor power domain is OFF. The contents of any on-chip static random access memory (SRAM) are preserved. The contents of the system external shared memory 160 may be preserved by placing the memory in a self-refresh mode at the expense of additional power consumption. Activity on wake peripherals via wake events enables the master crystal oscillator in master clock 144 using the oscillator control circuit. Wake events interrupt main microprocessor 111.

In DeepSleep 0 mode power consumption of the exemplary device is 1.30 mW. The wakeup time to recover the Active mode and full operation is less than 55 mS. Peripheral domain register information and microprocessor domain register information will be lost. Any data to be retained from on-chip peripheral registers in the peripheral power domain should be saved by the application to system external shared memory 160 before entering this DeepSleep 0 mode. External shared memory 160 is in a self-refresh mode. On wakeup, after the Power Control Manager 140 revives Clocks to Main Microprocessor 111, Power Control Manager 140 releases Main Microprocessor 111 from reset. A boot ROM for Main Management microprocessor 111 executes and branches to peripheral context restore followed by system resume. In the DeepSleep 0 mode both VDD_MPU and VDD_CORE are 0.95 V. The RTC power supply VDD_RTC and the I/O power are active. The wakeup power domain is ON. The microprocessor power domain), the peripheral power domain and the graphics power domain are OFF.

In DeepSleep 1 mode power consumption of the exemplary device is 6.82 mW. The wakeup time to recover the Active mode and full operation is less than 5 mS. In DeepSleep 1 mode, the supply to all voltage rails are maintained, the RTC power domain, the wake up power domain and the peripheral power domain are ON. The microprocessor power domain is OFF and the graphics power domain is preferably OFF. Graphics power domain could be optionally ON at the cost of about 2.3 mW more power consumption. Data in peripheral domain registers and microprocessor domain registers is preserved. The crystal oscillator of master clock 144 is disabled. The contents of internal SRAM are preserved. The system external shared memory 160 is in a self-refresh mode. Activity on wake peripherals via wake events enables the master crystal oscillator in master clock 144 using the oscillator control circuit. On wakeup, after the Power Control Manager 140 revives Clocks to Main Microprocessor 111, Power Control Manager 140 releases Main Microprocessor 111 from reset. A boot ROM for Main Management microprocessor 111 executes and branches to system resume. In the DeepSleep 1 mode both VDD_MPU and VDD_CORE are 0.95 V. Wake events interrupt main microprocessor 111.

In DeepSleep 2 mode power consumption of the exemplary device is 10.22 mW. The wakeup time to recover the Active mode and full operation is less than 3 mS. In DeepSleep 2 mode the supply to all voltage rails are maintained. The wake up power domain, the microprocessor power domain and peripheral power domain are ON. The graphics power domain preferably is OFF. The graphics power domain could be optionally ON at the cost of about 2.3 mW more power consumption. Data in peripheral domain registers and microprocessor domain registers is preserved. The master crystal oscillator is disabled. The contents of internal SRAM are preserved. The contents of external shared memory 160 may be preserved by placing external shared memory in a self-refresh mode. Activity on wake peripherals via wake events enables the crystal oscillator of master clock 144 using the oscillator control circuit. Wake events interrupt main microprocessor 111. DeepSleep 2 mode power consumption may be lowered further by 1.5 mW by using the power control manager 140 to control to lower the external VDD_MPU supply to retention voltage of 0.8 v.

Figure 2:
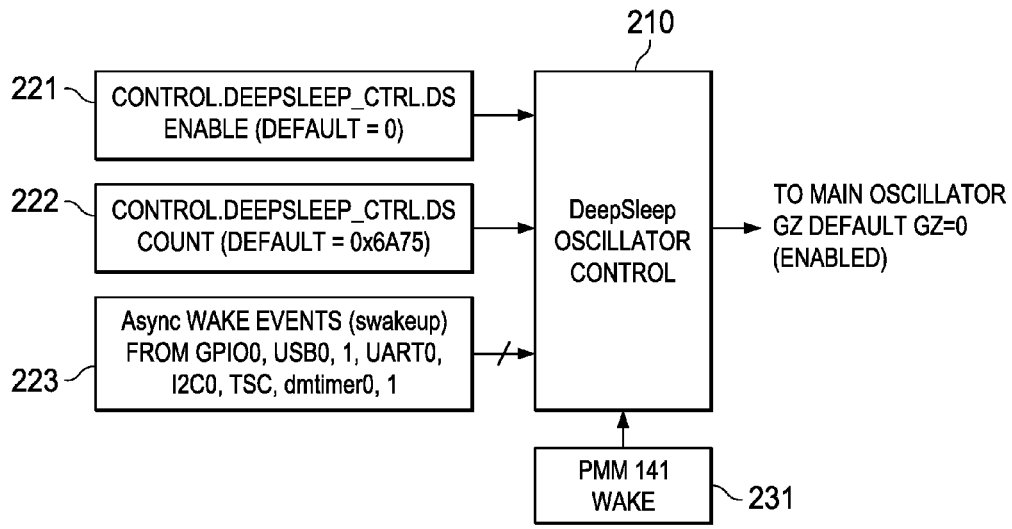
FIG. 2 illustrates control of the deep sleep clock according to an aspect of this invention.

FIG. 2 illustrates a DeepSleep oscillator control circuit 210 used to control an oscillator. DeepSleep oscillator control circuit 210 is disabled during any DeepSleep mode and enabled during Active mode and upon wakeup. On reset the oscillator initializes as enabled and DeepSleep oscillator control circuit 210 initializes as disabled (inactive) by default. Setting a DSENABLE bit of DEEPSLEEP_CTRL register 221 activates DeepSleep oscillator control circuit 210 for deepsleep. Once this is set and whenever wake power management microprocessor (PMM) 231 enters standby, the oscillator control will disable the oscillator (GZ=1) causing the clock to be shut OFF. Any asynchronous event 223 from the wakeup sources (such as General Purpose I/O GPIO0, Universal Serial Bus USB0, Universal Asynchronous Receiver/Transmitter UART0, an I²C0 input, a touch sensed by a Touch Screen Controller or a RTC wakeup signal) will cause DeepSleep oscillator control circuit 210 to re-enable the oscillator (GZ=0) after a period controlled by DSCOUNT DEEPSLEEP_CTRL register 222. As noted in FIG. 2 the default value of DSCOUNT is hex 6A75.

Wake Sources/Events

The exemplary device supports the following wake sources from DeepSleep modes or Standby mode: GPIO0 bank; dmtimer1_1 ms (RTC based wakeup); USB2PHY (USB resume signaling from suspend) supporting both USB ports; TSC (touch screen controller) analog to digital converter (ADC) monitor functions; Universal UART0 (Infrared support); and I²C0. In standby mode, any peripheral interrupts can be used to cause wakeup as long they are enabled along with the corresponding PLLs and clocks.

In Standby mode power consumption of the exemplary device is 25 mW. The wakeup time to recover the Active mode and full operation is less than 1 mS. In the Standby mode the supply to all voltage rails must be maintained. The wake up power domain, the microprocessor power domain and the peripheral power domain are ON. The graphics power domain is preferably OFF. The graphics power domain could be optionally ON at the cost of about 2.3 mW more power consumption. Data in peripheral domain registers and microprocessor domain registers is preserved. Data in on-chip SRAM and external shared memory 160 is preserved. The power consumption can be minimized if the supply voltage is reduced to its 50% nominal operating voltage. The crystal oscillator of master clock 144 is ON. Under software control the required phase locked loops 145 to 149 are active depending upon wakeup or use case requirements and the rest are placed in low power bypass modes. All non-essential module blocks are clock gated OFF. A peripheral interrupt to main microprocessor 111 will cause it to un-clock gate a module which services the interrupt. The clock must be maintained to those peripherals that will generate the interrupt from peripheral power domain. SDRAM contents are preserved. This is useful for quick standby resume. Standby mode power consumption may be lowered further by 1.5 mW by using the microprocessor wake control to lower the external VDD_MPU supply to retention voltage of 0.8 V.

In Active mode, the supply to all voltage rails is maintained. All power domains are ON state and the device is fully functional. For low power active use cases, the active power of main microprocessor 111 can be saved by duty-cycle idling (ON/OFF/ON). Power consumption of the exemplary device is about 1000 mW. One or more PLLs 145 to 149 are ON. The voltage supplied VDD_MPU and VDD_CORE are as defined by 50% nominal voltage, nominal voltage or 120% nominal voltage.

Figure 3:
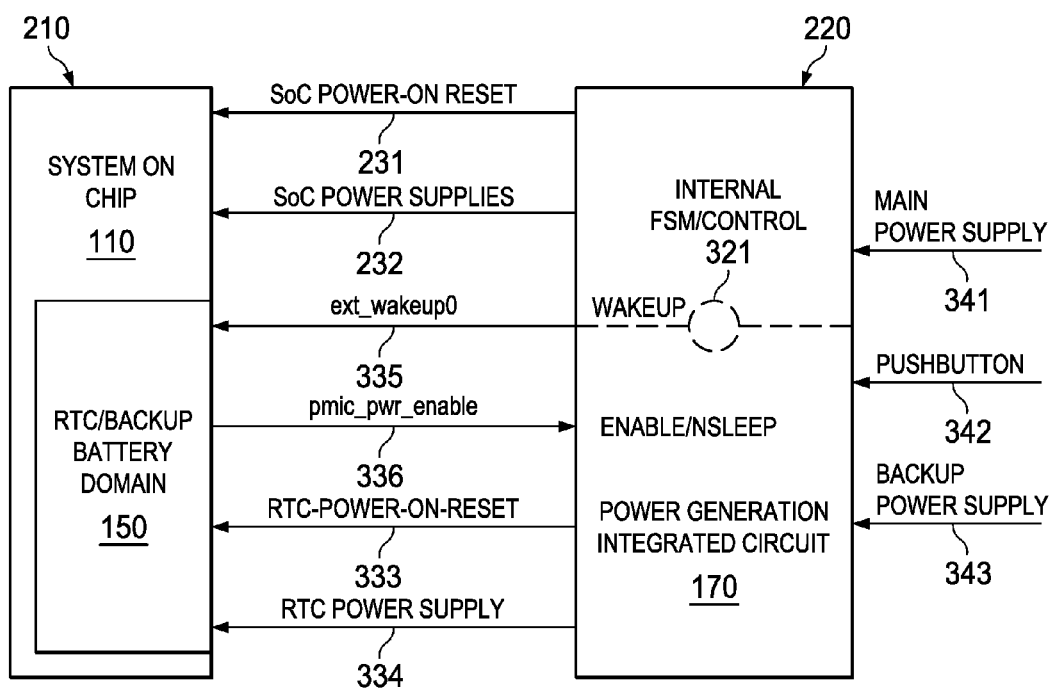
FIG. 3 illustrates communication between the real time clock module of the exemplary device and an external power generation integrated circuit.

FIG. 3 illustrates the high level view of a system which includes a RTC only mode. The system diagram also illustrates signals between SoC 110 and power generation integrated circuit 170 as driven by the end application. If the RTC only mode is not required or implemented by an end application, the RTC power supply 334 may be shorted to SoC power supply 332 and the SoC power-on-reset 331 may be shorted to RTC-power-on-reset 333.

There are 2 options for RTC power supply when the application implements the RTC only mode. The first option employs a single 1.8 V supply. In this first option power generation integrated circuit 170 preferably uses an internal RTC voltage amplifier with load regulation (VALR) Low Drop Out (LDO) linear voltage regulator to generate the SoC power supplies 334. The power consumption in this first option is about 80 µW. The second option employs dual voltage supplies at 1.8 V and 1.1 V. This second option disables the internal RTC VALR LDO linear voltage regulator using a LDO power down pin. The power consumption is about 40 µW in this second option.

The RTC battery backup domain 150 of the exemplary device includes a Real Time Clock Subsystem (RTCSS), a dedicated on-chip 32.768 Hz crystal oscillator and I/O pins associated with RTCSS. These I/O pins include pmic_pwr_enable 336 and ext_wakeup0 335.

There are two shutdown options. The first shutdown option is the accidental or forced removal of the main power supply. No special hardware is required to support this first option. The second option is a planned shutdown. This second option includes de-assertion of pmic_pwr_enable 336 via a primary RTC alarm function.

There are two wakeup options. The first wakeup option is an external event signaled via ext_wakeup0 335. The second wakeup option is a RTC wakeup alarm function.

In the RTC-only mode, only the RTC power supply is expected to be ON. The remaining power supplies are expected to be OFF. Some or all segments I/O supplies may be turned ON at the cost of additional power. This ensures that those I/O segments are supplied power. Pull resistors on the board are needed for each pin of the I/O pins which are powered up to avoid I/O pins from floating. The required pull value depends on the interface requirements during this mode. For external shared memory 160 to be in self-refresh mode during RTC only mode, a CKE pin of the memory interface needs to have a pull-down on the board. Further memory controller 131 asserts the self refresh signal.

Figure 4:
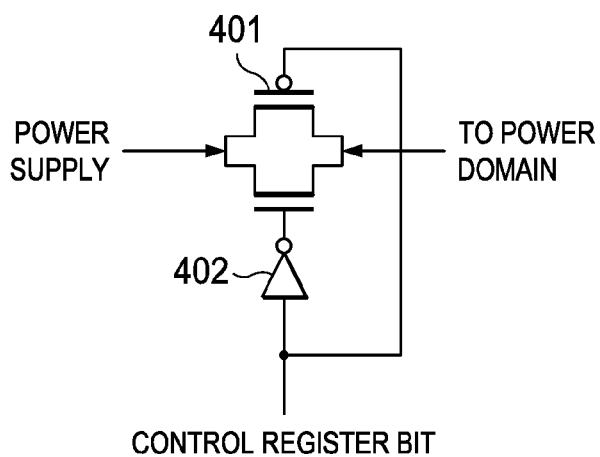
FIG. 4 illustrates a manner of power supply control from a control register bit.

FIG. 4 illustrates a circuit for controlling power supply to the power domains. Pass gate 401 includes a P-channel and an N-channel MOSFET. The corresponding power supply is connected to one commonly connected source-drain of pass gate 401. The power line to the controlled power domain is connected to the other commonly connected source-drain of pass gate 401. Inverter 402 ensures that both the P-channel and an N-channel MOSFET of pass gate 401 are either both conducting (ON) or both non-conducting (OFF) depending upon the digital state of corresponding control register bit. Thus the power supply is connected to or disconnected from the power domain dependent upon the digital state of corresponding control register bit.

Figure 5:
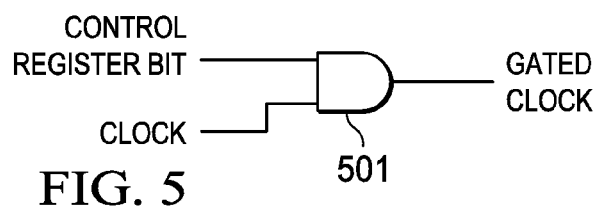
FIG. 5 illustrates a manner of clock gating from a control register bit.

FIG. 5 illustrates a circuit for clock gating. The corresponding clock is supplied to one input of AND gate 501. The corresponding bit of the control register is connected to a second input of AND gate 501. In normal operation the clock regularly switches between a digital 1 and a digital 0. If the corresponding bit of the control register is 1, then the output of AND gate 501 corresponds to the input clock signal. If the corresponding bit of the control register is 0, then the output of AND gate 501 is always 0. This effectively blocks application of the clock signal to the corresponding clock domain.

Memory Power States

The power control manager 140 has power control states configurable by software and as defined in the Table 1 below. CSWR is Closed SWitch Retention and OSWR is Open SWitch Retention. For each power control state, Table 1 defines the state of the power domain and the corresponding power domain memories.

TABLE 1

| Power Control State | Power Domain State | Memory State |
| --- | --- | --- |
| Active | ON (Active) | Active/RTA |
| Inactive | ON (Inactive) | Active/RTA |
| CSWR | ON (Inactive) | Retention or OFF (software configurable) |
| OSWR | OFF | Retention or OFF (software configurable) |
| OFF | OFF | OFF |

Depending upon the memory type the memory is either in an active state or a Retention Till Access (RTA) state in the Inactive mode. The memory groups are as follows. The control for memory power state is on a per group basis. Thus the memories within a particular group are not independently controllable. The exemplary device includes the following memory groups. In the peripheral power domain Group 1 includes an on-chip memory controller random access memory (RAM) and industrial communication subsystems (ICSS) memories and Group 2 includes the rest of the memories. In the microprocessor power domain Group 1 includes an on-chip memory controller RAM (64 KB). In the graphics power domain all the memories are in Group 1.

Adaptive Body Bias

This invention makes use of programmable Adaptive Body Biasing (ABB) for the microprocessor to allow the selection between either the optimization of performance or the optimization of power. Reverse Body Biasing (RBB) minimizes leakage while Forward Body Biasing (FBB) increases performance.

Functional Sequencing Overview

When the main microprocessor 111 operating system (OS) is idle, software initiates the power management sequence using a Wait for Interrupt (WFI) instruction. The sequence is as follows:

main microprocessor 111 Active;

main microprocessor 111 Idle (executing WFI);

power management microprocessor 141 Active;

power management microprocessor 141 Idle; and main microprocessor 111 Active.

The main microprocessor 111 and power management microprocessor 141 are not generally expected to be active at the same time. Power management microprocessor 141 along with power control manager 140 provide primary power management for the main microprocessor power domain and the peripheral power domain. Other power domains, such as the graphics power domain, may be handled directly by main microprocessor 111 software.

Figure 6:
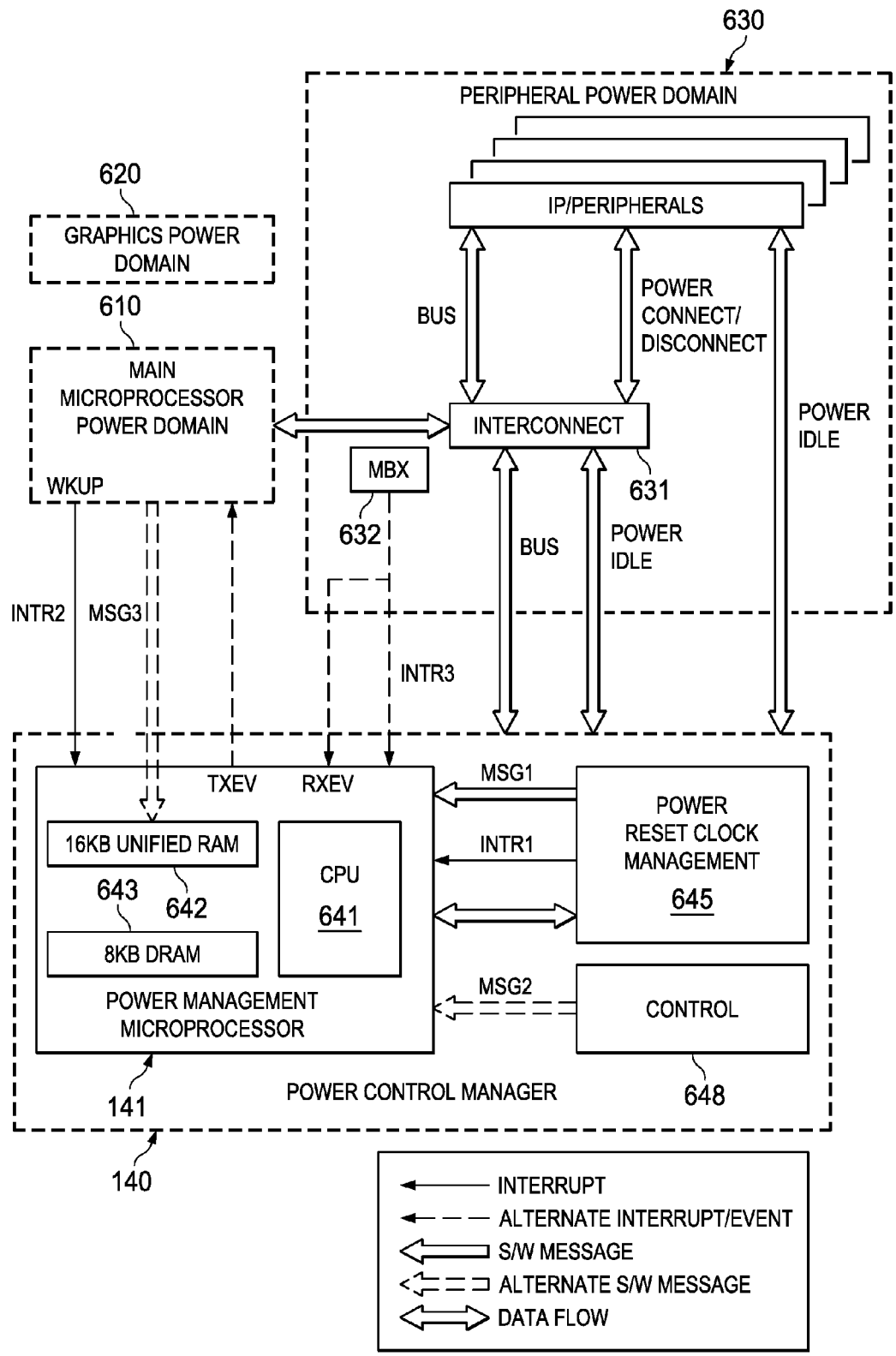
FIG. 6 illustrates a signal flow diagram of the present invention.

FIG. 6 illustrates a power management signals flow view of this invention. FIG. 6 illustrates main microprocessor power domain 610, graphics power domain 623 and peripheral power domain 630 connected to power control manager 140. Power control manager 140 includes power management microprocessor 141 including CPU 641, a first memory 16 KB unified RAM 642 and a second memory 8 KB DRAM 643. Power control manager 140 further includes power reset clock management 645 and control 648. In the preferred embodiment these are autonomous finite state machines with hardwired programming to assist power management microprocessor 141. Peripheral power domain 630 is connected to power control manager 140 via a power/idle but, a power connect/disconnect bus via interconnect 631 and a bus also via interconnect 631. MBX generates an interrupt INTR3 to power control manager 140. Main microprocessor 111 in microprocessor power domain 610 supplies a wakeup signal as interrupt INTR2 to power management microprocessor 141, supplies a massage MSG3 to power management microprocessor 141 and is responsive to a TXEV signal from power management microprocessor 141. Power Reset Clock Management 645 supplies an interrupt INTR1 to power management microprocessor 141 and supplies a massage MSG1 to power management microprocessor 141. Power Reset Clock Management 645 exchanges data with power management microprocessor 141 via a data bus. Control 649 supplies a massage MSG2 to power management microprocessor 141.

Sleep Sequencing

The high level system level guidelines for sleep sequencing of the exemplary system are as follows. This sequence includes both hardware and software. Main microprocessor 111 power is saved during active use by periodically idling. All the remaining steps are applicable for the DeepSleep modes and the standby mode unless specifically mentioned.

(1) The application running on main microprocessor 111 saves the context of peripherals memories supporting retention. This step is only required for the DeepSleep 0 mode.

(2) The application suspends tasks.

(3) The application suspends drivers.

(4) The main microprocessor 111 on-chip memory controller RAM remains in retention mode.

(5) Main microprocessor 111 software prepares power domains to enter OFF mode. This includes setting the program clock and power domains switches, saving contexts, etc.

(6) Main microprocessor 111 software loads on-chip memory controller RAM for wakeup restoration. This includes saving External Memory Interface (EMIF) settings, public/secure restoration pointers, etc.

(7) Main microprocessor 111 software executes an idle instruction from external shared memory 160 which will branch to an idle instruction in level 3 onchip memory controller RAM.

(8) Main microprocessor 111 software saves registers, flushes caches and puts external shared memory 160 in self-refresh.

(9) Main microprocessor 111 software executes a wait for interrupt (WFI) instruction.

(10) Any peripheral interrupt in the next steps will trigger a wake interrupt to power management microprocessor 141 via a WAKUP signal (INTR2 in FIG. 6). This triggers a wake sequence.

(11) After the microprocessor power domain is clock gated, power reset clock management 645 will interrupt power management microprocessor 141 (INTR1 in FIG. 6).

(12) Power management microprocessor 141 starts execution as follows:

(a) Power management microprocessor 141 configures the phase locked loops in power down States (bypass modes). During Idle bypass mode (low power mode) the PLL goes into bypass and provides the clock outputs directly from the oscillator clock;

(b) Power management microprocessor 141 disables module peripheral interconnects based on messages MSG1, MSG2 and MSG3;

(c) A hardware Power connect/disconnect/Idle protocol kicks off and completes;

(d) Power management microprocessor 141 turns OFF power domains for DeepSleep 0 mode and DeepSleep 1 mode only based on messages MSG1, MSG2 and MSG3;

(e) Power management microprocessor 141 lowers the power generation integrated circuit 170 voltage to 50% nominal;

(f) Power management microprocessor 141 configures I/O circuits for lowest power as dictated by maim microprocessor 111 according to messages MSG2 and MSG3; and (g) Power management microprocessor 141 executes WFI.

(13) A hardware oscillator disable circuit in power control manager 140 disables the oscillator in master clock 144 once power management microprocessor 141 executes WFI if so configured by main microprocessor 111.

Wakeup Sequencing

The high level system level guidelines for wakeup sequencing are as follows. It includes both hardware and software. Main microprocessor 111 power for active use is saved using idle duty cycle (ON/OFF/ON) only steps.

(1) One of the wakeup triggers configured during sleep sequencing initiates a wakeup.

(2) The wake event switches on the oscillator on master clock 144 if it was switched OFF during a DeepSleep mode.

(3) The wake event initiates interrupts to power management microprocessor 111.

(4) On an interrupt in response to the wake event, power management microprocessor 141 executes the following:

(a) Restores the voltage to required power domains;

(b) Enables locking operation in phase locked loops 145 to 149. The power management microprocessor 141 clock continues to be the RC oscillator clock until the CORE PLL locks;

(c) The power management microprocessor 141 switches ON the power domains and/or enables clocks for the peripheral power domain (PD PER).
(d) The power management microprocessor 141 switches ON the power domains and/or enable clocks for the microprocessor power domain.
(e) The power management microprocessor 141 executes WFI.

(5) For only DeepSleep 0 and DeepSleep 1 main microprocessor 111 executes the following:
(a) Main microprocessor 111 execution branches to 0x14000, the ROM reset vector;
(b) The ROM branches main microprocessor 111 to wake from deepsleep function based on control module register or on-chip memory controller RAM setting;
(c) Retains the EMIF settings in on-chip memory controller RAM. Power control manager 140 contents are preserved since as it is powered in the wakeup power domain;
(d) ROM Branches the main microprocessor 111 to restore location in on-chip memory controller RAM which restores EMIF, registers, a memory management unit, invalidates caches and restores registers from stack;
(e) Main microprocessor 111 resumes execution after the idle instruction in external shared memory 160;
(f) Main microprocessor 111 sets power domain states to ON including graphics power domain, enables clocks, restores I/O PAD configurations and restores contexts;
(g) Resumes drivers;
(H) Resume tasks; and
(I) Restores the application context in DeepSleep 0 mode only.

Emulation Support
Overview

There are 2 JTAG main secondary TAPs on SoC 110. These are to main microprocessor 111 and power management microprocessor 141. These allow a debugger to send override directives for power reset and clock of the corresponding microprocessor.

The dual access protocol (DAP) allows to access all the components in the EMULATION power domain but also to the complete memory map of the device thanks to an on-chip master port and wakeup on access feature. The debug registers inside main microprocessor 111 are accessible through an APB interface of the DAP.

The emulator provides a set of commands allowing the override of the power management, clock and reset settings during an emulation session. There isonel dedicated set of commands per TAPs.

The emulator commands may be intrusive for power, clock and reset controls but they must be non-intrusive from the applicative execution point of view. This means the power control manager 140 statuses about power state, clock activity and reset activity must be seamless to the debugger's command while the effective power state, clock activity and reset activity may not be the applicative desired state.

It may be necessary to be intrusive from the applicative execution to support some emulation capabilities. This is typically the case when the debugger needs to access a module through the DAP. Indeed, it is mandatory to power up the peripheral power domain to perform this emulation access as this module is mapped as an interconnect master. Further, it is necessary that peripheral power if OFF is intrusively woken up by CortexM3 debugger for the main microprocessor 111 debugger to access peripheral power domain registers and memory.

Debugger Reset Commands Requirements
Table 2 summarizes the emulation reset commands.

TABLE 2

| | Command | Description |
|---|---|---|
| Reset | ASSERT | Forces assertion of the TAP |
| | INRESET | Warm reset status. It is low when the reset of the TAP is functionally active |
| | WAITINRESET | Condition to extend the warm reset assertion |
| | RELEASEFROMWIR | Condition to release the warm reset if WAITINRESET was the only cause of warm reset of the TAP |
| | BLOCK | Condition to force the release of the warm reset |
| | UNNATURALRESET | It is asserted high when the current reset state of the TAP doesn't match with the applicative settings due to emulation controls within or outside of ICEPICK |
| | LATCHRESETBUS | The reset control signals have changes and are stale and can be latched by the PRCM |
| | LATCHRESETBUSACK | The reset control signals have been taken into account by the PRCM |

The debugger can control the assertion and the release of the reset for each secondary TAP of the device. Depending on the sub-system mapped on the secondary tap, only part of the commands set is required.

The reset commands have effect only on the warm reset of the sub-system. Emulation logic is typically sensitive to the cold reset of the sub-system and must be preserved in such a situation. The reset command may affect some of the sub-system peripherals. The debugger can control the assertion and the release of each processor reset in the device. It can override application reset control for the following the main microprocessor 111 and the power management microprocessor 141.

Table 3 summarized the emulator Power Management Commands.

TABLE 3

| | Command | Description |
|---|---|---|
| PowerandClock | PWRDOWNDESIRED | The sub-system would power down without ICEPICK override. |
| | CLKDOWNDESIRED | The sub-system would shut down the clock without ICEPICK override. |
| | FORCEACTIVE | Force the sub-system power state to the ACTIVE state (power in ON and clock is running). |
| | FORCEACTIVEACK | Acknowledge the FORCEACTIVE command. The subsystem clock is running. |
| | INHIBITSLEEP | Prevent sleep transition on the sub-system. Keep the sub-system power state ON if already ON or the clock running if already running. |
| | INHIBITSLEEPACK | Acknowledge the INIHIBITSLEEP commend when the power and the clock of the sub-system are stable. |
| | CLKSTATE | Indicate if the sub-system is clocked when high. |

TABLE 3-continued

| Command | Description |
|---|---|
| PWRSTATE | Indicate if the TAP of the subsystem is powered when high. |

USB Suspend

Soc 110 may be configured as a USB High-Power Bus-powered device (function) and is connected to a remote hub or a host. In this configuration the maximum suspend power allowed to be consumed by the USB bus powered device according to the USB 2.0 standard is 2.5 mA at 5 V VBUS or 12.5 mW. Upon detecting idle for more than 3 ms, sleep transition must start. After the next 10 ms the device may draw only suspend power. The Host or Hub initiates resume signaling for 20 ms. After the resume signaling ends, the device has 10 ms of resume recovery time after which it is expected to respond to commands from USB Host. Typically BULK/CONTROL/INTR transfers can be ignored (NAKed) beyond resume recovery time and the response is a function of user experience. However, if ISO transfers are initiated after the resume recovery time, they would be forever lost unless processed by A8. Any of the DeepSleep modes or standby may be used for USB suspend. The use of these modes will be based on tradeoff between low power and wakeup time.

USB Enumeration

SoC 110 may be configured as a USB High-Power Bus-powered device (function) and connected to a remote hub or a host. The maximum power allowed to be consumed by the USB bus powered device when it is connected to Host/Hub and until USB enumeration is complete according to the USB 2.0 standard is 100 mA at 5 V VBUS (500 mW).

In a first implementation Boot and USB enumeration is executed traditionally as follows:
  ROM boots the device from USB;
  All required PLLs are activated;
  The operating system (OS) boots;
  The USB driver is initialized within OS; and
  USB enumeration is completed.
This implementation may not achieve low power.

In a second implementation lower power is achieved as compared to the first implementation as follows:
  ROM boots the device from a peripheral and the microprocessor is running at low frequency;
  The USB PLL is active;
  The microprocessor PLL is active;
  The boot code enumerates USB as a bare minimum function and requests active (higher) USB power budget from Host assuming the basic enumeration completes;
  The OS boots; and
  The USB driver is initialized within the OS;
  Actual device enumeration or re-enumeration is performed.

Ethernet Use Cases

SoC 110 is expected to wakeup when plugged into a Local Area Network (LAN). The standby mode can be used. This is implemented via a Wake-On-LAN (WOL). WOL is a standard defined for systems (like IP Phone, Set-top-Box, computers, etc) which always remain on-line (connected to a LAN).

A first implementation uses magic packet detection. The microprocessor actively engages with an Ethernet controller to filter magic packets in order to detect WOL. The core PLL in active and the oscillator is active. This is expected to consume about 100 to 200 mW of standby power in the microprocessor.

A second implementation uses an Ethernet MAC magic packet detection. The microprocessor power domain is OFF. The core PLL is active to provide Ethernet clocks. The Ethernet switch actively filters magic packets without intervention of the microprocessor. On detection of magic packet the Ethernet switch asserts a wake interrupt to the microprocessor. This is expected to consume about 10 to 15 mW of standby power in the microprocessor. The exemplary device preferably does not support this feature which is not supported by Ethernet IP.

A third implementation used physical layer (PHY) magic packet detection. The exemplary device includes an Ethernet PHY with built-in magic packet detection. The exemplary device may be placed in DeepSleep 1 mode or DeepSleep 2 mode. Magic packet detect signaling between the PHY and the exemplary device wakes microprocessor from a DeepSleep mode. This is expected to consume about 2 to 3 mW of standby power in the microprocessor.

What is claimed is:

1. An electronic device disposed on a single integrated circuit comprising:
  a plurality of power domains operable to be independently powered, said plurality of power domains including at least one microprocessor domain including a programmable main microprocessor;
  a power control manager connected to said plurality of power domains for selectively powering said plurality of power domains, said power control manager including
    a set of control registers storing individual control bits,
    a power switch for each power domain connected to a corresponding control register, each power switch having an ON state supplying electric power to said corresponding power domain upon a first state of said corresponding control register and an OFF state not supplying electric power to said corresponding power domain upon a second state of said corresponding control register opposite to said first state, and
    a programmable power management microprocessor separate from said programmable main microprocessor including a central processing unit and a memory storing an alterable set of program instructions to control said state of individual control bits of said set of control registers, said programmable power management microprocessor having a smaller data computational capacity than said main microprocessor, wherein the alterable set of program instructions is dynamically alterable at an application level after manufacture of said single integrated circuit by introduction of new states and sequences into said memory.

2. The electronic device of claim 1, wherein:
  said plurality of power domains includes a peripheral domain including at least one data communications peripheral controlling communication between said programmable main microprocessor and external devices.

3. The electronic device of claim 1, wherein:
  said plurality of power domains includes a peripheral domain including a memory controller adapted for connection to an external memory external to said electronic device controlling communication between said programmable main microprocessor and the external memory.

4. The electronic device of claim 1 wherein:
said programmable power management microprocessor is programmable to select one of a set of reduced power modes, each reduced power mode selectively powering a unique subset of said plurality of power domains.

5. The electronic device of claim 1, further comprising:
a plurality of clock domains operable to be independently clocked;
said power control manager wherein said set of control registers includes a bit corresponding to each clock domain, and said programmable power management microprocessor operable to control said state of individual control bits of said set of control register corresponding to said clock domain to controllably supply a clock to said clock domain or block supply of said clock to said clock domain.

6. The electronic device of claim 5, wherein:
said programmable power management microprocessor is programmable to select one of a set of reduced power modes, each reduced power mode selectively powering a unique subset of said plurality of power domains and selectively supplying clocks to a unique subset of said clock domains.

7. The electronic device of claim 1, further comprising:
a power supply generation integrated circuit separate from said single integrated circuit supplying a plurality of electrical voltages to said single integrated circuit.

8. The electronic device of claim 7, wherein:
said power control manager is connected to said power supply generation integrated circuit and controls a voltage level of at least one of said plurality of electrical voltages.

9. The electronic device of claim 8, wherein:
said single integrated circuit further includes an independently powered real time clock generating a wakeup signal upon reaching a predetermined real time; and
said power supply generation integrated circuit is connected to said real time clock and generates a predetermined set of voltage levels on said plurality of electrical voltages upon detection of said wakeup signal.

10. The electronic device of claim 9, further comprising:
a plurality of clock domains operable to be independently clocked; said power control manager wherein said set of control registers includes a bit corresponding to each clock domain, and said programmable power management microprocessor operable to control said state of individual control bits of said set of control register corresponding to said clock domain to controllably supply a clock to said clock domain or block supply of said clock to said clock domain; and wherein said real time clock includes a clock oscillator independent of said power control manager controllably supplied clocks.

11. The electronic device of claim 1, wherein:
said programmable power management microprocessor employs data words having a first size, said programmable main microprocessor employs data words having a second size, said first size smaller than second size.

12. The electronic device of claim 1, wherein said programmable power management microprocessor employs data a first clock frequency, said programmable main microprocessor employs a second clock frequency, said first clock frequency less than second clock frequency.

* * * * *